United States Patent Office 3,429,181
Patented Feb. 25, 1969

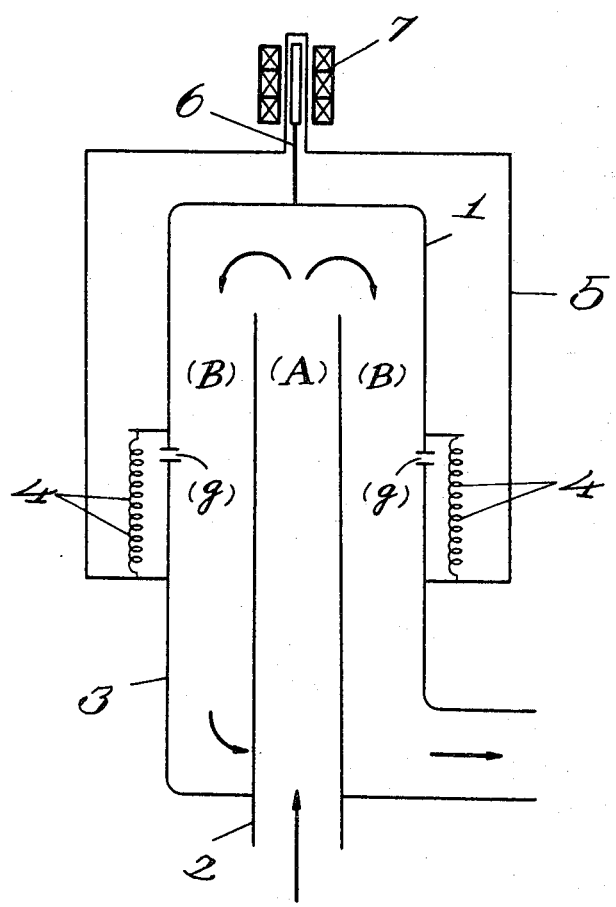

3,429,181
FLOW METER
Kamekichi Shiba, No. 159, Kago-cho, Bunkyo-ku,
Tokyo, Japan
Filed Oct. 22, 1965, Ser. No. 500,666
U.S. Cl. 73—228                                    1 Claim
Int. Cl. G01f 1/06

ABSTRACT OF THE DISCLOSURE

A flow meter including stationary tube means, movable tube means having at least one pressure receiving surface and at least one edge spaced by an annular gap from a corresponding end edge of the stationary tube means, resilient means connected to the movable tube means and biased to yieldably resist the increase of the actual length of the gap, and means for measuring the amount of fluid fed into and out of the flow meters through the stationary tube means as a function of the displacement of the movable tube means relative to the stationary tube means.

---

The present invention relates to a flow meter.

There are several types of flow meters by which the amount of flow of a fluid is determined by measuring the pressure of the fluid flowing through a tube, but all those types of flow meters are based on the Bernoulli theorem. The Bernoulli theorem however is based on the law of the conservation of energy in the field of dynamics and there are many cases where the theorem cannot be applied.

The present invention aims to provide a flow meter which can measure the amount of flow of a fluid by employing a movable tube even in the cases where the Bernoulli theorem cannot be applied. In the cases where the Bernoulli theorem is applicable the apparatus according to the present invention can be made much simpler in comparison with the cases where the theorem cannot be applied.

In consideration of all kinds of energy the law of conservation of energy holds good without exception, but when the energy is limited to dynamic energy as when the Bernoulli theorem is proved, the law of conservation of energy does not hold good when thermal energy is related, and therefore in the case when the viscosity of fluid cannot be ignored, the Bernoulli theorem is inapplicable. On the other hand, the law of conservation of momentum based on the law of motion holds good within the scope of Newton's dynamics without exception and the law of conservation of momentum is the law wherein, "the increase of momentum of particles in an infinitesimal time $dt$ is equal to $dt$ times the resultant of external force which are received by the particles," and the flow meter according to the present invention is based on said law of conservation of momentum.

Since the flow meter according to the present invention is also a flow meter by which the correct amount of flow of a non-compressible fluid in constant flow is measured like conventional flow meters, this assumption is taken in the description of the flow meter according to the present invention hereinbelow.

The drawing illustrates the flow meter according to the present invention which is a duplex tube system wherein the fluid flows into the inner tube and flows out through the gap between the inner and outer tubes, the tubes being connected by means of a spring.

The flow meter according to the present invention is so constructed as a portion of the tube, through which the fluid flows, is movable in the direction of the tube. Said movable portion of the tube will be called the main tube. The main tube is normally coupled with a stationary tube by means of a pair of springs. The main tube is also so adapted as to be movable in one direction only, but the means for limiting the movement to one direction only is not shown in the drawing.

The fluid in the flow meter according to the present invention is made to flow through an inner tube and impinge on the end wall of a cup-like member or main tube of the same diameter as an outer tube and flow out of the gap between the inner tube and the outer tube. Different from the U-shape tube, as it is sufficient to have the flow-out portion only made universal joint, the apparatus becomes a flow meter simple in construction. Furthermore, if the fluid contained in the airtight container is the same as the measured fluid, $\rho = \rho'$, and the flow meter placed in a vertical position becomes similar in action to the one placed in a horizontal position. In this case, as it is not necessary that the universal joint has to be the one without the alternation of fluid like bellows, if the cup-like tube is movably connected with a stationary wall, by means of a spring or the like the construction of the flow meter will further be simplified.

The figure shows an example wherein a duplex tube is employed and the flow meter being in a vertical position, the fluid flows in upwardly. The flow meter shown in the drawing includes a substantially vertically arranged cup-shaped member 1 having an upper closed end and a lower open end defined by a circular edge of a given diameter. An outer tube 3 having a diameter equal to the aforementioned given diameter is arranged coaxially with the cup-shaped member with an edge of the outer tubes spaced from the circular edge of the cup-shaped member to define an annular gap $g$. Resilient means 4 in form of coil springs are connected to the cup-shaped member 1 and the resilient means are biassed to yieldably resist movement of the cup-shaped member away from the end edge of the outer tube. The cup-shaped member 1 is surrounded by a closed container 5 which is fluid-tightly connected to a portion of the outer tube 3 spaced from the end edge thereof so that the annular gap $g$ is within the container. An inner tube 2 of a diameter smaller than that of the outer tube 3 is coaxially arranged with the latter and the inner tube has an end portion which extends into the cup-shaped member with the end of the inner tube spaced from the closed end of the cup-shaped member. The fluid to be measured is fed through the inner tube of the cross-section A into the cup-shaped member and flows out from the latter through the annular space of the cross-section B between the inner and the outer tube. The pressure of the fluid displaces thereby the cup-shaped member 1 in axial direction against the force of the resilient means 4 until a state of equilibrium is reached. The displacement of the cup-shaped member in axial direction is measured by a differential transformer including an iron core 6 connected to the cup-shaped member 1 for movement in axial direction therewith and a stationary coil 7 surrounding the core 6 with clearance.

The flow meter of the kind described above is called a duplex tube flow meter.

What is claimed is:

1. A flow meter comprising, in combination, a cup-shaped member having a closed end and an open end defined by a circular edge of a given diameter; an outer tube having a diameter equal to that of said given diameter and being arranged coaxially with said cup-shaped member along a vertical axis with an end edge of said outer tubes spaced from said circular edge of said cup-shaped member to define an annular gap therewith; resilient means connected to said cup-shaped member and biased to yieldably resist movement of said cup-shaped member away from said end edge of said outer tube; a closed container surrounding said cup-shaped member and being fluid-tightly connected to a portion of said outer tube spaced from said end edge thereof so that said annular gap is within said container; an inner tube of a diameter smaller than that of said outer tube coaxially arranged with the latter and having an end portion extending into the cup-shaped member beyond said circular edge thereof for feeding a fluid against the closed end of the latter so that the fluid flows then out of the cup-shaped member through the clearance between said inner and said outer tube; and means for measuring the amount of flow passing through the flow meter as a function of the displacement of said cup-shaped member under the influence of the forces acting thereon during flow of fluid thereinto, said means comprising an iron core connected to said member for movement therewith in axial direction and a stationary coil surrounding said coil.

References Cited

UNITED STATES PATENTS

| | | | |
|---|---|---|---|
| 2,804,771 | 9/1957 | Brown | 73—228 |
| 3,138,955 | 6/1964 | Uttley | 73—228 |
| 3,333,468 | 8/1967 | Jacobs. | |
| 2,605,638 | 8/1952 | Pearson | 73—228 |
| 2,707,394 | 5/1955 | Lewis | 73—228 |
| 3,218,854 | 11/1965 | Brown | 73—228 |

FOREIGN PATENTS 798,743   7/1958   Great Britain.

RICHARD C. QUEISSER, *Primary Examiner.*

EDWARD D. GILHOOLY, *Assistant Examiner.*